April 18, 1967  W. A. KILMER ETAL  3,314,300
SPINDLE STOP MECHANISM

Filed Jan. 22, 1965  2 Sheets-Sheet 1

INVENTORS
William A. Kilmer
Thomas E. Fitzgerald
BY
Parker Brochman,
ATTORNEYS.

April 18, 1967
W. A. KILMER ETAL
3,314,300
SPINDLE STOP MECHANISM
Filed Jan. 22, 1965
2 Sheets-Sheet 2
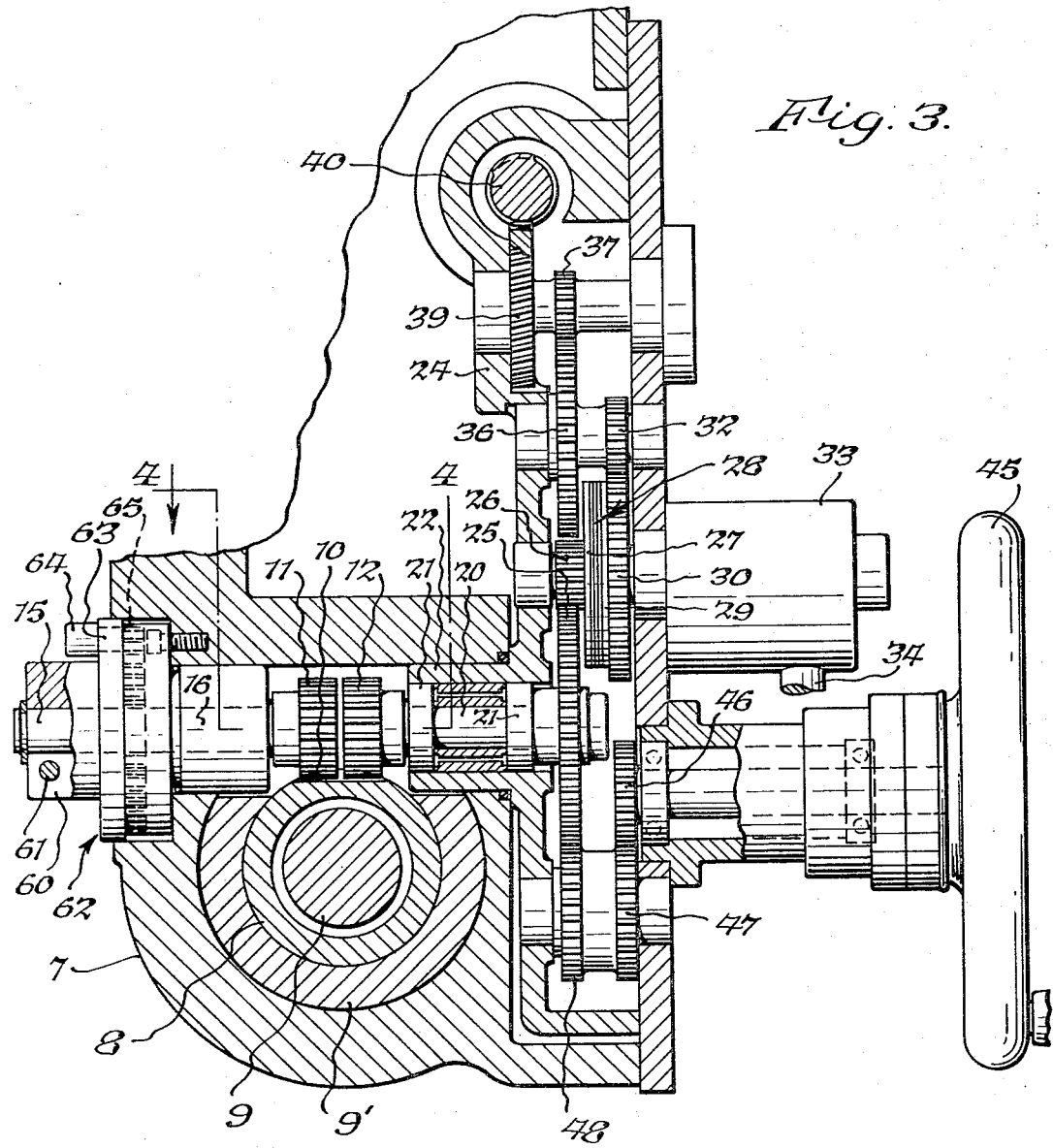
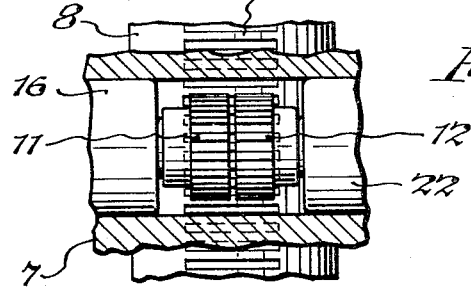

United States Patent Office 3,314,300
Patented Apr. 18, 1967

3,314,300
SPINDLE STOP MECHANISM
William A. Kilmer and Thomas E. Patykula, Elmira, N.Y., assignors to Hardinge Brothers, Inc., Elmira, N.Y.
Filed Jan. 22, 1965, Ser. No. 427,416
5 Claims. (Cl. 74—409)

This invention relates to means for accurately stopping the movement of a member, such as a longitudinally adjustable quill, in such a manner as to eliminate backlash which might result in a slight movement of the member after reaching its stop position.

One of the objects of this invention is to provide a mechanism of improved and simplified construction for eliminating backlash in a stop device.

Another object is to provide mechanism of this kind in which a pair of pinions engage rack teeth on the member, one pinion being positioned by stop means of suitable construction and the other being acted on by drive means acting through a slip clutch to exert force on the first mentioned pinion to hold the same against its stop means.

In the accompanying drawings:

FIG. 3 is a sectional plan view thereof on line 3—3, FIG. 1.

FIG. 4 is a fragmentary section thereof on line 4—4, FIG. 3.

Figure 1:
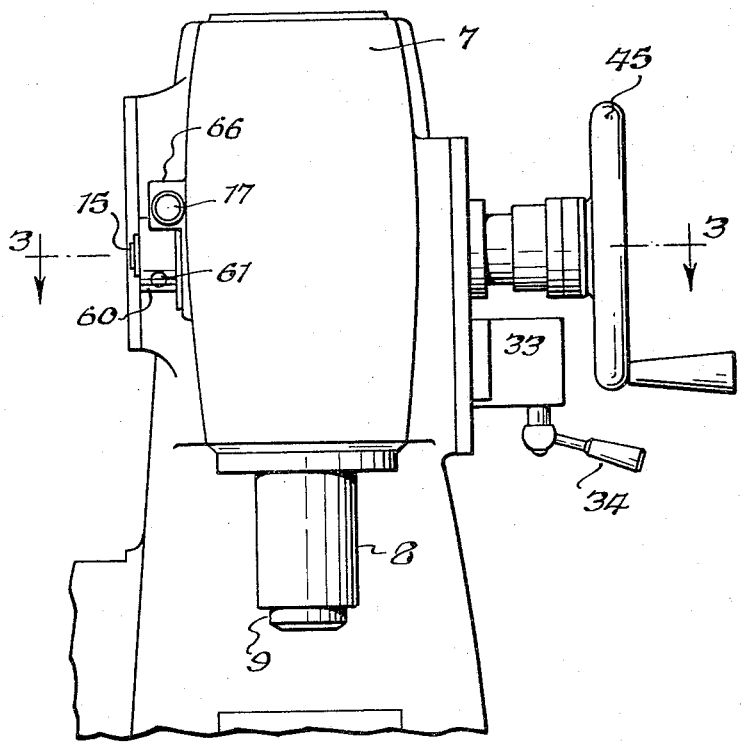
FIG. 1 is a front elevation of a part of a vertical milling machine having spindle stop means embodying this invention applied thereto.
Figure 2:
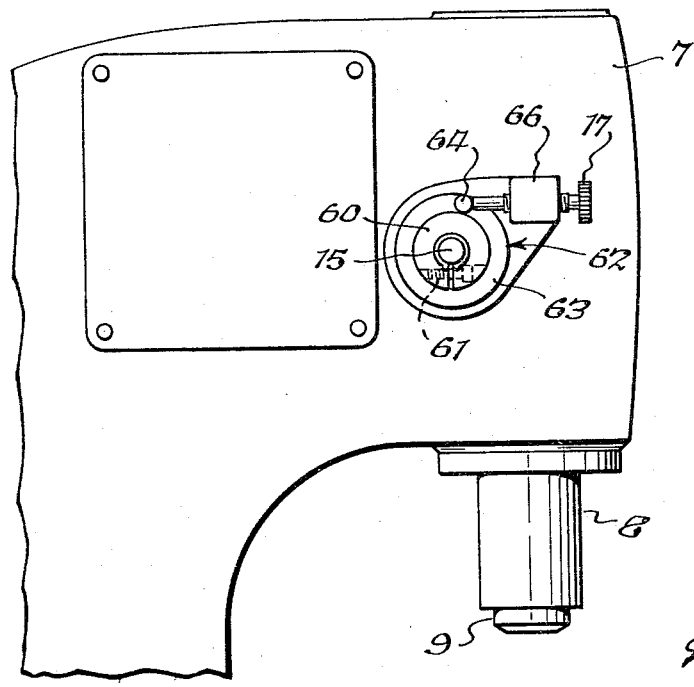
FIG. 2 is a side view thereof.

Our invention is shown in the drawings as applied to a vertical milling machine having a headstock 7, but it will be understood that our stop mechanism may be applied to other machines having a quill mounted, rotary spindle. 8 represents a quill in which a spindle 9 is journalled and which has rack teeth 10 formed on a side thereof. The quill is guided in its movement in a bushing 9' which is solidly mounted in a part of the headstock. The rack teeth 10 mesh with a pair of pinions 11 and 12. The pinion 11 is adjustable manually into a stop position by any suitable mechanism, which of itself is not a part of this invention but is partly shown to facilitate an understanding of this invention. The pinion 11 is rigidly mounted on a shaft 15 and rotatably journalled in bushing 16. At the outer end of the shaft 15, adjustably fastened thereto by means of a split hub 60 and clamp screw 61 is a spring loaded return mechanism 62. The hub 60 has an enlarged flange 63 integral therewith and carries a stop lug 64. A spring 65 in the mechanism 62 continuously urges the shaft 15 and pinion 11 to lift the quill 8 and its spindle upwardly away from the workpiece. When the quill 8 is moved downwardly toward the workpiece, its rack teeth 10 rotate the pinion 11 and shaft 15, the hub 60 and flange 63 to rotate the stop lug 64 into engagement with an adjustable stop screw 17. The stop screw 17 is threaded into a projecting boss 66 which is integral with the headstock 7.

We have provided a drive for the pinion 12 which exerts a steady pressure on the pinion 11 to hold the same fixedly in its stop position. For this purpose the pinion 12 is rigidly mounted on a shaft 20 journalled in bearings 21 in a hollow projection or sleeve 22 of the supporting frame 24 suitably mounted on the headstock of the machine. Rotation is applied to the shaft 20 by means of a gear 25 secured to this shaft and this gear meshes with a pinion 26 connected with a part or disk 27 of a slip clutch 28.

Rotation of the clutch 28 is such that in driving the gears 26, 25, the shaft 20 and its pinion 12 will be driven in a direction that will advance the quill 8 and its spindle 9 downwardly toward the workpiece. The pinion 11, as previously explained, will be urging the quill in the opposite direction, i.e. upwardly through bias of the spring 65. When the quill reaches the preset, downward position, the lug 64, by engaging the stop screw 17, stops any further downward movement and the clutch 28 will slip and thus hold the quill 8 at this stopped position without any lost motion or backlash, and maintain the cutter into the workpiece at a precise depth of cut. The torque at the clutch, of course, is sufficient to prevent the cutter from raising out of the workpiece at any time. The cutter can thus be held down at a constant pressure, while the work is moved laterally to it, thus eliminating the usual quill locking clamp.

The slip clutch 28 may be of usual and well known construction, that shown including two disks 27 and 29 connected to suitable yielding or friction means through which power is supplied from the disk 29 to the disk 27. The disk 29 is connected with a gear 30 which is driven by means of a pinion 32. The gear 30 is suitably mounted on a shaft journalled in a housing 33 which contains suitable means for pressing the disk 29 against the yielding friction means to drive the disk 27 and the pinion 26 connected therewith. The pressure exerted on the shaft carrying the gear 30 is supplied by a spring in housing 33 and is released or engaged by means of a handle 34.

The pinion 32 is driven by means of a gear 36 on the same shaft with this pinion, and driven from another gear 37 which is driven by means of a worm gear 39. This worm gear meshes with a worm 40 driven by any suitable power actuated means.

As a result of this construction torque may be applied from the worm 40 through the slip clutch to the pinion 12 meshing with the rack teeth 10 on the quill. Since there is considerable elasticity in the metal of the train of gears driving the pinion 12 and also in the stop mechanism which positions the pinion 11, it will be obvious that by exerting a continuous torque on the pinion 12, the pinion 11 will be held against its stop by the pinion 12 through the rack teeth on the quill. Consequently any backlash or looseness which may be in the train of gears leading to the pinion 12 or in the stop means holding the pinion 11 will be eliminated by the continuous torque acting on the pinion 17 through the slip clutch, and the quill will be held constantly in its stop position without any movement therefrom due to backlash or otherwise.

It is also desirable to provide means for moving the quill by hand and for this purpose a hand wheel 45 is provided which is connected by means of gears 46, 47 and 48 to the gear 25. By moving the hand wheel 45 manually to urge the pinion 12 against the rack teeth 10 and pinion 11, a constant pressure can be exerted by the hand wheel on the pinion 12 after the pinion has been moved to the stop position so that any backlash which might tend to move the quill out of its stop position can be prevented by the manual pressure on the hand wheel.

By holding the quill and spindle against a stop so that any movement away from the stop is prevented, a very high accuracy can be obtained in the work produced by the mechanism to which our improvements are applied.

It will be understood that various changes in the details, materials and arrangements of parts which have been herein described and illustrated in order to explain the nature of the invention may be made by those skilled in the art within the principle and scope of the invention as expressed in the appended claims.

We claim:
1. A device for moving and holding a member in stop position,
   said member having rack teeth thereon,
   a pair of pinions with teeth meshing with said rack teeth, adjustable stop means cooperating with one of said pinions to limit the rotation thereof for holding said member against movement beyond a stop position, and drive means for yieldingly applying torque to the other of said pinions to move said member into a position in which the first of said pinions is in its stop position and to continue the application of torque to hold said first pinion in its stop position.

2. A device according to claim 1 in which said yielding drive means include a slip clutch through which power is transmitted to said other pinion before and after said first pinion has been moved into stop position to eliminate backlash acting on said first pinion.

3. An adjusting device for cooperating with a longitudinally adjustable quill,
rack teeth on said quill,
a pair of pinions having teeth meshing with said rack teeth,
stop means acting on one of said pinions to hold the same against movement when the quill reaches a desired position,
drive means which apply torque continuously to the other of said pinions to move said first mentioned pinion through said rack teeth against said stop means and to hold the same yieldingly against said stop means,
said drive means including a slip clutch interposed in said drive means to urge said first pinion in continuing engagement with said stop means,
whereby transmission of force directly from one pinion to the other through said rack teeth eliminates backlash in said adjusting device.

4. An adjusting device for cooperating with a longitudinally adjustable quill,
rack teeth on said quill,
a pair of pinions having teeth meshing with said rack teeth,
stop means acting on one of said pinions to hold the same against movement when the quill reaches a desired position,
and drive means including a train of gears connected with the other pinion of said pair of pinions,
and a slip clutch included in said train of gears whereby continuous torque is applied to said other pinion and through said rack teeth applied to move said first pinion against its stop means.

5. An adjusting device according to claim 4 and including a hand wheel connected with said gear train for moving said other pinion manually to urge said first pinion into its stop position.

No references cited.

DAVID J. WILLIAMOWSKY, *Primary Examiner.*

L. H. GERIN, *Assistant Examiner.*